June 14, 1955 — G. A. GERARD — 2,710,590
PRESSURE SENSITIVE TAPE DISPENSING DEVICE
Filed March 15, 1951 — 2 Sheets-Sheet 1

INVENTOR
George A. Gerard
BY
ATTORNEY

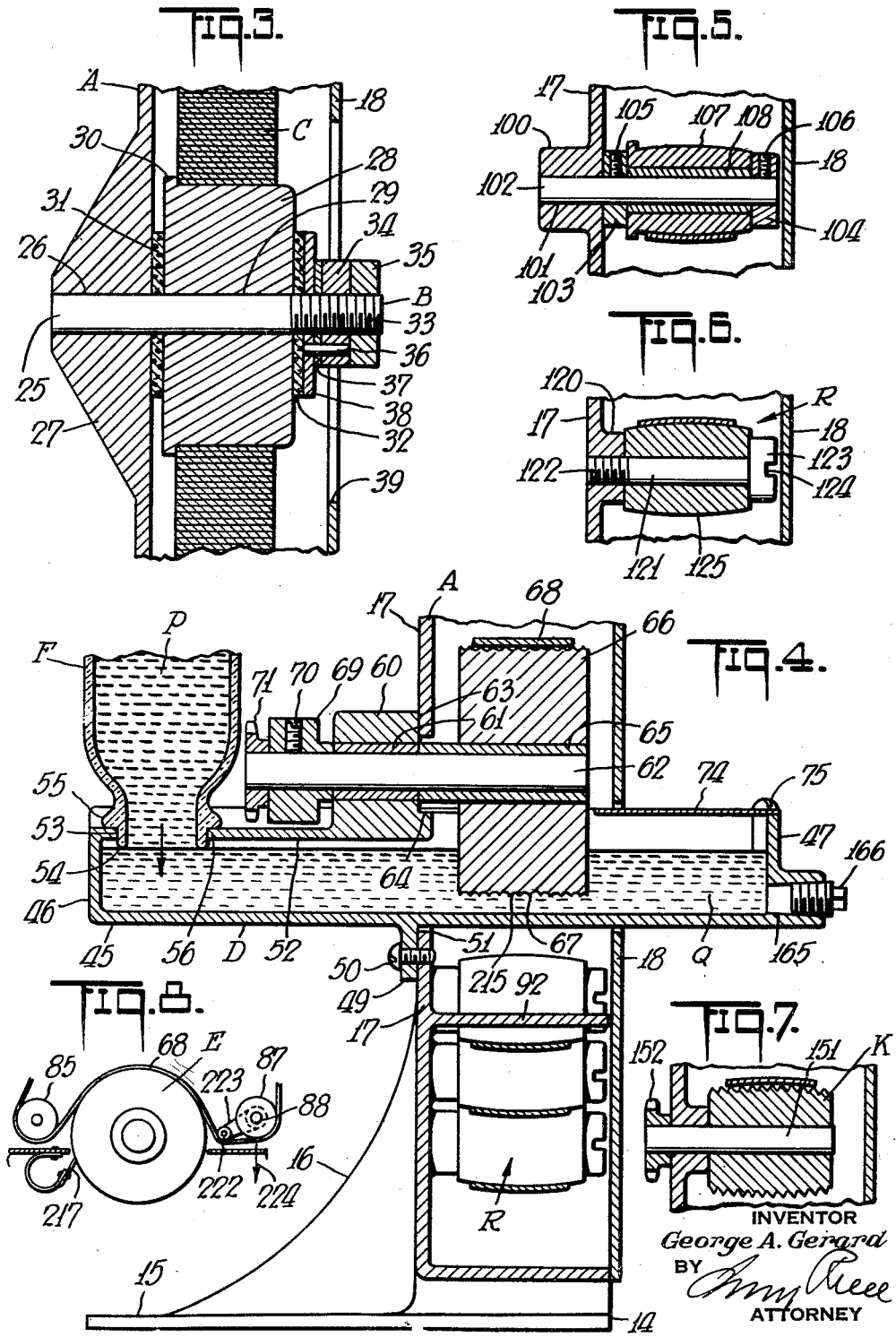

2,710,590

PRESSURE SENSITIVE TAPE DISPENSING DEVICE

George A. Gerard, Roselle, N. J.

Application March 15, 1951, Serial No. 215,719

4 Claims. (Cl. 118—65)

The present invention relates to a machine for preparing tapes carrying a pressure sensitive adhesive.

Although not limited thereto the present invention will be particularly described in connection with portable lightweight machines and porcedures used in connection therewith for preparing various types of tapes of fabric, paper, regenerated cellulose, cellulose acetate and the like, with rubber base adhesives.

In the usual types of masking tape on pressure sensitive tapes supplied to regenerated cellulose or other plastic films, considerable difficulty is experienced in so manufacturing the tape that it can be rolled after application of the adhesive which is stored and then used with assurance that the tape can be stripped and used without offsetting of adhesive.

For example, with many types of tape carrying pressure sensitive adhesive it is necessary to use a primer coat on one side of the tape to carry the adhesive, with an adhesive rejecting coating on the other side of the tape which is to contact the adhesive carrying face. This not only involves expensive extra coating operations but results in increased weight due to the extra coatings of non-adhesive material and also results in the addition of chemicals which do not enhance the life or stability of the rubber adhesive or of the tape itself.

These preparatory operations, including reeling, storage and maintenance of suitable humidity conditions over long periods of time in connection with merchandising, storage and shipments of the rolls of adhesive coated tapes, involve considerable expense and greatly increase the cost of the final product and are of little value to the ultimate consumer.

Moreover, these coils of tape vary considerably upon ageing and standing, and frequently the adhesive decreases in adhesive value and, moreover, the tape frequently becomes quite brittle.

A particular difficulty resides in the fact that many types of tape material cannot be coated with adhesive and coiled or made into rolls for shipment, storage and merchandising because the rubber adhesive and other pressure sensitive adhesive will be absorbed or otherwise disadvantageously affected upon standing over prolonged periods of time with resultant breakdown of the adhesive qualities of the tape.

It is among the objects of the present invention to provide a small, compact dispenser for tapes carrying pressure sensitive adhesive which will substantially immediately manufacture the pressure sensitive tape prior to dispensation and usage thereof without the necessity of making coils and preparing rolls of the tape, and providing for prolonged storage and merchandising usage at a period long after the actual application of the adhesive.

Another object is to provide a device and procedure for making pressure sensitive adhesive coated tapes which will readily permit the consumer to vary the type of tape material, whether plastic, paper or fabric, and which will eliminate the necessity of using either primer coats on one side to hold the adhesive or rejection coatings on the other side which will prevent offsetting of the rubber adhesive.

A further object is to provide a lightweight, readily portable device for manufacturing and dispensing tapes with pressure sensitive adhesives which may be readily installed in the home, store, factory, office or elsewhere where tapes are to be used in connection with wrapping, packing, shipping, sealing envelopes and the like.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable, according to one embodiment of the present invention, to provide a casing which may be made of lightweight aluminum or magnesium alloys, or even of plastic materials which will receive a coil of the tape material to be coated with the pressure sensitive adhesive. Interiorly of the receptacle there will be positioned a tray containing a solution of the pressure sensitive adhesive, desirably dissolved in a readily volatile organic solvent.

Projecting into this tray will be a roller over which the tape is fed and said roller will carry sufficient of said adhesive to assure a proper application of the adhesive to one side of the tape as it is carried thereover.

Then the tape is caused to pass in more or less of a spiral but preferably in a spiral which will conform to the exterior of the casing until it is ready to be removed from the casing and used or consumed. Desirably the spiral is formed by a series of separated rollers or crown guide members adjacent the corners of the casing, which guide members will contact the uncoated face of the tape and permit a drying exposure of the coated side of the tape. The area through which the tape operates is desirably baffled so as to separate it from the feed roll as well as the liquid applicator tray and roller.

Over the spiraling tape desirably a current of hot air is blown by means of a small electric fan desirably affixed with an electrical heating resistance coil. At one side of the casing there will be an opening through which the tape may pass out of the casing and which will provide a tear-edge which will enable small pieces of the tape to be torn off as they are required.

Desirably the last roller before the dry coated tape is removed is preferably provided with a roughened or diamond shaped embossed surface with the points thereof projecting upwardly. The tape on being drawn over or past said roller will be connected by way of a chain drive or other drive connection to the coating roll so that the dispensing or removal of the dry coated tape will at the same time draw the tape from the reel or spool and pass it over the coating roll so that it obtains a satisfactory coating of the adhesive. Desirably the rubber adhesive solution will be fed from the container which may consist of an inverted bottle shaped receptacle placed into the tray in such a manner as to maintain a constant level of the coating solution therein.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 3 is a fragmentary vertical transverse sectional view upon the line 3—3 of Fig. 1 upon an enlarged scale as compared to Fig. 1.

Fig. 4 is a transverse fragmentary vertical sectional view upon the line 4—4 of Fig. 1 upon an enlarged scale as compared to Fig. 1, showing the coating roller as well as the solution carrying tray.

Fig. 5 is a transverse vertical fragmentary sectional view showing one of the guide rollers, the particular guide roller being at the side of the coating roller and above the tray.

Fig. 6 is a fragmentary transverse sectional view upon the line 6—6 of Fig. 1 and upon an enlarged scale as compared to Fig. 1, showing one of the guide rollers adjacent a corner of the container.

Fig. 7 is a fragmentary transverse vertical sectional view upon the line 7—7 of Fig. 1 upon an enlarged scale as compared to Fig. 1.

Fig. 8 is a diagrammatic side elevational view of an alternative form of applicator roll and associated feed-on and take-off rollers.

Figure 1:
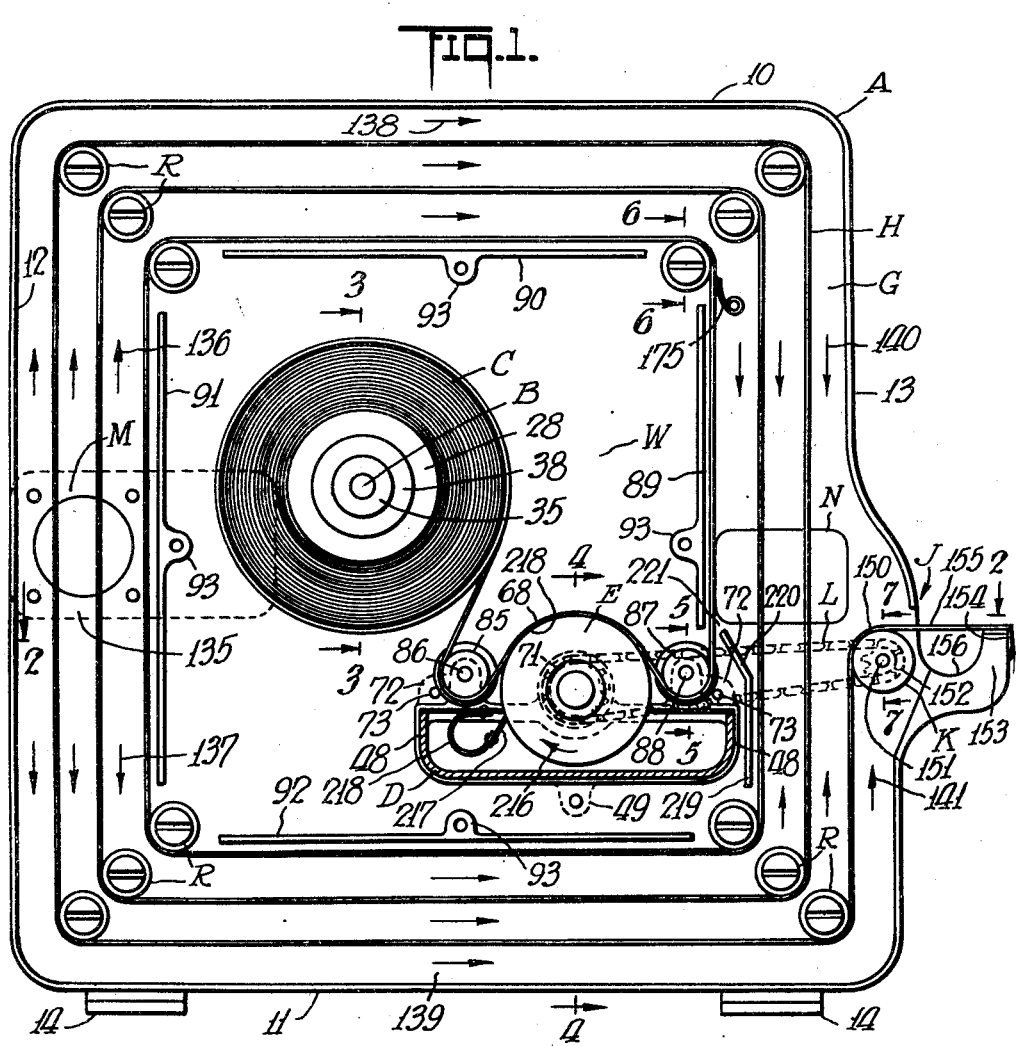
Fig. 1 is a side elevational view of the container partly in section with the side cover removed so as to show the interior construction thereof, including the central coil of tape material to be coated, the coating tray and coating roller, the spiral of tape to be coated, and the outlet dispensing opening.
Figure 2:
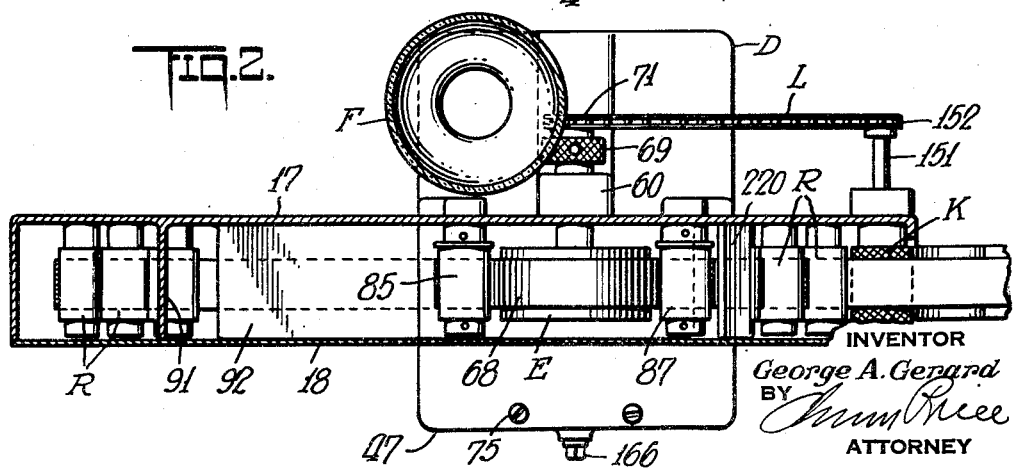
Fig. 2 is a horizontal transverse sectional view upon the line 2—2 of Fig. 1.

Referring to Fig. 1 there is shown a casing A which receives the spindle B, carrying a roll of sheet material to be adhesively coated such as regenerated cellulose, cellulose acetate, fabric, paper or the like.

Within the container A is the tray D carrying the coating solution into which projects the rotatable coating roller E.

The tray D is fed from the exterior of the casing A by a feed or supply container F (see Fig. 4).

The container A has a central chamber W for receiving the roll of material C as well as the coating tray D and the coating roller E, and it has an exterior chamber G through which the coil of tape material H passes. The tape is dispensed from the container A at the position J over a drive roller K. The drive roller K will actuate the chain drive in turn to drive the coating roller E.

The warm air from a fan or blower will be supplied through the opening M and will pass through the annular compartment G and flow out through the opening and after having subjected the coil of coating tape H to drying.

Referring particularly to Fig. 1, the casing has the top wall 10, the bottom wall 11, the rear wall 12 and the forward wall 13. The bottom wall 11 carrying the legs 14, which is indicated in Fig. 4, may have extensions 15 with reenforcing webs 16.

The back wall 17 may carry the tray D as well as the spindle B. The other forward removable wall 18 may be held in position by removable screws or turnbuckles or snap hinges if desired.

The spindle B is shown in side view in Fig. 1 and in enlarged view in side section in Fig. 3.

The spindle B has a central shaft 25 which fits into the opening 26 in the enlargement 27. Upon the spindle is positioned the hub 28 upon which the material C may be wound. The hub 28 has a central opening 29, fitting on the shaft 25, and it has a lip 30 for holding such material in position.

The hub 28 has washers 31 and 32 on each side thereof also carried on the spindle 25. The end of the shaft 25 is threaded as indicated at 33, and it carries the nuts 34 and 35. The inside nut has a pin 36 which projects through the washer 37 into a plate 38 which fits on the side of the washer 32.

The opening 39 in the wall 18 enables access to the hub 28, and by removing the nuts 34 and 35 and the cover plate 18 it is possible readily to replace the hub 28 and the material thereon.

The tray is shown in relatively small scale in side sectional view in Fig. 1 and in relatively enlarged transverse sectional view in Fig. 4.

The tray D as shown has a base wall 45 with the side walls 46, 47 and 48. The bottom wall 45 has a downwardly extending fin 49 which is attached by means of the screw 50 to the portion 51 of the back wall or base wall 17 of the container A.

The outside portion of the tray as shown in Fig. 4 has a partial cover 52 with an opening at 53 which receives the nipple 54 at the inverted neck of the container or bottle F. The nipple 54 has a shoulder 55 which contacts the periphery 56 of the opening 53.

The container or inverted bottle F will feed the adhesive solution P downwardly into the main body of liquid indicated at Q in the tray D. The cover 52 of the outside portion of the tray D has an enlargement 60 which receives the bearing sleeve 61 and carries the shaft 62. The enlargement 60 has a flat face 63 which bears against the wall 17 of the container A. The shouldered portion 64 will project into the interior of the container A. The shaft 62 will also carry a sleeve 65 upon which is mounted the coating roller 66.

The coating roller will dip into the solution Q as indicated at 67 and carry the solution upward and apply it to the portion of the tape as indicated at 68 in Fig. 1.

The exterior portion of the shaft 66 carries the collar 69 held in position by the screw 70 and also the sprocket wheel 71.

As shown in Fig. 1 the tray in addition to being held in position by the ear 49 and the screw 50 will also be held in position by means of the ears 72 and the screws 73. The portion of the tray not covered by the plate 52 will be covered by the removable sheet metal cover 74 which is held in position by means of the screws 75. The cover 74 may be readily removed after removal of the plate 18 so as to permit inspection of the solution Q.

Referring to Fig. 1 the tape is fed off the roller C and under the guide roller 85, which is carried on the spindle 86. From the guide roller 85 the strip of material will pass, as indicated at 68, over the coating roller E. Then it will pass under the roller 87 on the spindle 88 and into the spiral H.

The central chamber F will be separated from the annular outside chamber G by the partitions 89, 90, 91 and 92. These partitions may be molded or cast integrally with the base wall 17 or they may be mounted thereon by means of the ears and screws indicated at 93.

The guide roller 87 and spindle 88 are shown upon enlarged scale in Fig. 6 and it is of the same construction as the guide roller 85 of Fig. 1.

As shown in Fig. 5 the back plate 17 has an enlargement 100 with an opening 101 having the shaft 102 fitted thereinto. The shaft 102 has the nuts or washers 103 and 104 with the set screws 105 and 106. These washers or discs 103 and 104 determine the position of the crowned roller 107 thereon. The crowned roller receives the sleeve 108 which fits on the shaft 102. The corner guide rollers are best shown in enlarged section in Fig. 6.

The wall 17 carries the enlargement 120 into which the shaft 121 is threaded as indicated at 122. The end of the shaft receives an enlarged fillister head 123 having the slot 124. The crowned roller 125 will roll freely on the shaft 121 and guide the tape H in its spiral path around the annular chamber G.

The crowning of the rollers 125 of the units R will permit guiding of the tape and prevent it from running off the rollers as it moves through the drying compartment G.

A suitable blower arrangement is mounted at the opening M as indicated by the mounting arrangement 135. This blower may consist of a suitably driven electrical heating fan with a heating coil and this will blow the air into the opening M and it will pass through the annular space G, as indicated by the group of arrows 136, 137, 138, 139, 140 and 141.

The air then having passed entirely through the chamber G may be exhausted through the opening N. It will be noted that at least three sections of the tape are exposed at every point to the flow of warm air as indicated by the numerals 136 to 141, and that the tape H must pass through the chamber G at least three times before it is dispensed at J.

The dispensing roller K has a series of diamond projections thereon so that when the tape is drawn over it, as indicated at 150, the roller K will be turned, driving the shaft 151 and the sprocket 152. The sprocket 152 will drive the chamber L and in turn drive the sprocket 71. Thus, as the tape is drawn out through the dispensing opening J, a new supply of tape will be drawn off the roller C and coated by the roller E.

As indicated at the right of Fig. 1 there is an outwardly projecting lip 153, with tearing edge 154, over which the dry coated tape at 155 may be torn off in suitable pieces. The lip has a recess 156 so that the finger and thumb may be inserted therethrough to grasp the dry and coated tape.

The tray D may be emptied by means of the flush opening 165 and the removable flush plug 166.

When needed, a new supply of liquid adhesive may be mounted at F.

In the present apparatus by removing the plate 18 it is possible to apply a roll of strip material at C or replace the material already at C with other material.

Then the material may be threaded under the guide roller 85 over the coating roller E and under the guide roller 87.

Then the strip material H may be threaded around the units R over the drive roller K to the tearing edge 154.

Whenever it is desired to make the adhesive tape the blower may be turned on driving the warm air in through the opening M, and then after a short period the tape is ready to be drawn out to the dispensing opening J. The operation may be carried on continuously and it may even be shut down over night without any great difficulty.

The tape H is immediately ready for use, has a fresh adhesive thereon, and no primer coat or repellant coat is needed.

If desired, a winder arrangement may be provided at the outlet end adjacent the tear member 154 to wind up the coated tape H so that it may be distributed to various places for usage. Such tape wind up may either be hand driven or electrically driven and a series of roller arrangements may be readily provided adjacent the structure or projecting lip 153 or be built into the projecting lip structure 153.

The roll of material as indicated at C in Fig. 1 may be changed where it is desired to have different types of tape whether or cloth, kraft paper or even fabric.

Various types of blowers may be positioned at M as shown in Fig. 1, and they are desirably motor driven, and the air is heated by means of incandescent resistance wires. An extra switch may be readily provided upon the wall or structure 17 opposite the removable plate 18.

Different types of liquid adhesive may be employed by changing the container at P in Fig. 4 and by draining the pan D by opening the plug 166.

The crowned rollers R will hold the tape H in position and prevent it from sliding in one direction or the other and will keep it upon the rollers as indicated in Fig. 6.

The bearing at 63 in Fig. 4 may be an oilite bearing. The cork members 31 and 32, as shown in Fig. 3, may be eliminated if desired.

If desired, a smoother blade may be provided as indicated at 175 in Fig. 1 to smooth the layer of adhesive deposited upon the tape H after it leaves the roller E.

A number of these blades 175 may be employed and if desired they may also be associated with the roller positioned closely adjacent to the roller 87.

The coating roller E as shown in Figs. 1 and 4 desirably has a plurality of cup like depressions 215 which take up the solution Q from the tray D as the roller rotates in the direction indicated by the arrow 216.

The doctor blade 217 held on the spring 218 will scrape off the excess of the adhesive solution before it is deposited upon the under side of the tape at 218. This will give a metering of the adhesive solution being applied to the under side of the tape 68, and by substituting different rollers E with a different spacing or depth of cups or depressions 215 it is possible to vary the amount of adhesive solution which is applied to the tape 68.

It will be noted that the tape 68 leaves the roller 85 before the application roller E, and then leaves the application roller E when passing on to the roller 87 at an angle of about 80° from the horizontal, which causes the adhesive to be accurately deposited upon and taken up on the web or tape 68 and prevents formation of streaks or rivulets. This will give a most desirable and accurate control and even deposition of the adhesive solution upon the under side of the tape 68.

The baffle plates 89, 90, 91 and 92 will normally separate the hot air circulation chamber G from the coating chamber F. An auxiliary baffle 219 with an inturned upper portion 220 is desirably provided to block off the area around the tray D.

The opening 221 will permit ready movement of the coated but not yet dry tape or web H to pass from chamber F to chamber G.

The bosses or extensions 93 on the separated plates 89, 90, 91 and 92 will form a means of mounting for the removable cover plate or wall 18.

The diamond shaped projections on the roller K, as shown in Fig. 7, take the form of closely spaced pyramids, the points of which contact and engage the coated face of the tape at 150. As a result the delivery roller K will assure a drive of the applicator roll E through the chain L at the tape speed which assures a more accurate and more even distribution of adhesive.

In the alternative embodiment, as shown in Fig. 8, the roller 85, the doctor blade 217 and the applicator E are of the same construction as shown in Figs. 1 to 6. However, the roller 87 is provided with an auxiliary guide roller 222 for conducting the tape 68 off the applicator roller E. This auxiliary guide roller 222 is held on an arm 223 which may be spring biased in the direction 224 to assure a maximum pick-up of the adhesive solution from the cups or depressions 215 in the roller E.

As many changes could be made in the above pressure sensitive tape dispensing device and process of preparing such tape, and many widely different embodiments of this invention could be made without departing from the scope of the claims, it is intended that all matter contained in the above description shall be interpreted as illustrative and not in a limiting sense.

The present application is a continuation-in-part of application Ser. No. 165,711 filed June 2, 1950, now Patent No. 2,631,562 granted March 17, 1953.

Having now particularly described and ascertained the nature of the invention, and in what manner the same is to be performed, what is claimed is:

1. A manually actuated mechanism for making pressure sensitive adhesive tape by applying a pressure sensitive rubber-like adhesive thereto in a central chamber followed by drying and dispensing in and from an encircling chamber which comprises providing a double casing having a central coating chamber and an outside drying chamber enclosing said first chamber, a tape supply means in said first chamber and a roller coater also in said first chamber for applying a pressure sensitive adhesive coating to one side of said tape as it is unrolled from said roll of tape and guides including a plurality of spaced guide rollers, said rollers contacting and carrying the said tape on its uncoated side and guiding the coated tape while the same is dried and a dispenser having a drive roller at one side of said casing to dispense the dried coated tape, said roller being operated as said tape is withdrawn by hand from said dispenser, said outside chamber having openings at opposite ends thereof to permit the blast of hot air to be passed through the outside chamber to dry said coating while said tape is passing through said second chamber over said rollers and a chain drive connection between said drive roller and said roller coater, so that said drive roller and roller coater will be operated together as said tape is withdrawn from said second chamber.

2. The mechanism of claim 1, said central chamber being separated from said outside chamber by a plurality of partitions extending between said guide rollers with the rollers acting to close the openings between the ends of said partitions at the corners and said rollers being centrally crowned to keep said tape in position thereon.

3. An apparatus for manufacturing pressure adhesive tape from a backing strip and a rubber adhesive solution as required, said apparatus being actuated as the tape is withdrawn therefrom, said tape being fed from a roll of tape, being roller coated with the adhesive, fed through a drying chamber in convolutions and then out through a dispensing opening and cut off as required by drawing said tape through said dispensing opening, said apparatus including a flat upright casing having parallel side plates, an inside coating chamber, an outside drying chamber, a roller coater in said coating chamber, a liquid adhesive supply to said roller coater in said coating chamber, said dispensing opening being in said drying chamber and a dispensing roller positioned at said opening driven by the drawing out of said tape and means to drive said roller coater directly from said dispensing roller.

4. The apparatus of claim 3, said drive roller and said roller coater having shafts transversely extending through the side plates and a sprocket chain connecting said shafts.

References Cited in the file of this patent
UNITED STATES PATENTS

| | | |
|---|---|---|
| 607,586 | Crowell | July 19, 1898 |
| 848,892 | Frost | Apr. 2, 1907 |
| 1,016,011 | Himoff | Jan. 30, 1912 |
| 1,177,744 | Vercellino | Apr. 4, 1916 |
| 1,384,081 | Mortimer | July 12, 1921 |
| 1,541,297 | Van Horn | June 9, 1925 |
| 1,914,375 | Krueger | June 20, 1933 |
| 1,921,939 | Parker et al. | Aug. 8, 1933 |